United States Patent [19]

Torimaru et al.

[11] 3,996,797
[45] Dec. 14, 1976

[54] MAGNETIC FLOWMETER

[75] Inventors: Takashi Torimaru; Kazuie Suzuki, both of Tokyo; Hiromu Kakiura; Tamotsu Kobayashi, both of Yokohama, all of Japan

[73] Assignee: Hokushin Electric Works, Ltd., Tokyo, Japan

[22] Filed: Jan. 22, 1976

[21] Appl. No.: 651,525

[30] Foreign Application Priority Data

Jan. 24, 1975 Japan .............................. 50-10271
Feb. 27, 1975 Japan .............................. 50-24780

[52] U.S. Cl. ......................................... 73/194 EM
[51] Int. Cl.² ......................................... G01F 1/60
[58] Field of Search ............................. 73/194 EM

[56] References Cited

UNITED STATES PATENTS 3,783,686  1/1974  Hentschel ...................... 73/194 EM
3,955,413  5/1976  Steele et al. .................. 73/194 EM Primary Examiner—James J. Gill

[57] ABSTRACT

A magnetic flowmeter wherein liquid to be metered is conducted through a flow tube to intersect a transverse magnetic field established by an electromagnet. The voltage induced in the fluid is transferred to a pair of electrodes mounted at diametrically-opposed positions on the flow tube. The electromagnet is energized by a low-frequency wave which is produced by applying the output of a full-wave rectifier to the excitation coils of the electromagnet through a switching element. The switching element acts to chop the full-wave rectified output in accordance with high-frequency pulses whose frequency is higher than that of a commercial electric power line, the duty cycle thereof being modulated by a low-frequency, sinusoidal wave whose frequency is less than that of the commercial line.

5 Claims, 12 Drawing Figures

MAGNETIC FLOWMETER

BACKGROUND OF THE INVENTION

This invention relates generally to magnetic flowmeters, and more particularly to a magnetic flowmeter whose electromagnet is excited by a low-frequency wave whose frequency is less than the usual 50 or 60 Hz frequency of a commercial electric power line.

In a conventional magnetic flowmeter arrangement, the usual practice is to make use of a commercial AC power line as an excitation source in that high power can easily be obtained therefrom. However, AC excitation at the frequency of a commercial power line gives rise to eddy current problems. These eddy currents are induced by AC excitation and flow through the fluid to be metered, thereby introducing zero drift error.

To overcome this drawback, it has heretofore been proposed to make use of an excitation technique in which the source is a low-frequency wave whose frequency is less than the usual 50 or 60 Hz commercial power line frequency. In this known technique, a low-frequency wave is generated by a low-frequency sinusoidal oscillator energized by DC power. The output of this oscillator is amplified by a power amplifier and then applied to the excitation coils of the magnetic flowmeter.

This known technique has certain practical disadvantages. Thus in the case of a magnetic flowmeter having a relatively large diameter, because its power requirements are high, this dictates an installation including a large-sized DC source, a large-sized amplifier and so on. It is therefore not feasible to use this known technique in conjunction with a magnetic flowmeter having a relatively large diameter.

Another prior art technique makes use of a low-frequency rectangular wave that is produced by switching a constant current. However, this method has the following drawbacks:

1. To produce a constant current, a relatively complex power source is required.
2. Since a rectangular wave is used as an excitation current, its high-frequency harmonic components introduce inductive noise components in a flow signal. Thus one must employ a complicated circuit to eliminate these unwanted electroinductive noise components.

Yet another known excitation method for a magnetic flowmeter is that disclosed in the Mannherz et al. U.S. Pat. No. 3,783,687, wherein the output voltage of a full-wave rectifier is applied to the electromagnet through a switching element, thereby reversing the voltage polarity at a low-frequency rate. However, since the excitation wave has a rectangular wave form, this method also gives rise to unwanted harmonic noise components.

SUMMARY OF INVENTION

In view of the foregoing, the main object of this invention is to provide a simple and low-cost, low-frequency excitation arrangement for a magnetic flowmeter in which harmonic wave noise component problems are obviated.

Another object of this invention is to provide a low-frequency excitation type magnetic flowmeter in which fluctuating components included in the excitation current are eliminated without the need for a dividing circuit having a complex construction.

Briefly stated, in a magnetic flowmeter in accordance with the invention, a switching element is interposed between the electromagnet and a power source, the switching element being "on-off" controlled at a high-frequency rate. To control the switching element, use is made of a pulse signal whose frequency is higher than that of the usual 50 or 60 Hz power line frequency and whose duty cycle ratio is varied at a low-frequency rate which is less than 50 or 60 Hz.

A significant feature of the present invention is that the switching element is on-off controlled at a high rate, thereby dispensing with the need for a switching element of the type appropriate to high-power applications.

Another advantage of this invention is that because the output of a full-wave rectifier is chopped by a switching element and then applied to the electromagnet, this makes possible the omission of a power rectifier.

Still another feature of the present invention is that since a low-frequency sinusoidal wave is used as an excitation wave, the undesirable effects of unwanted harmonic components are absent. Moreover, because an error signal is derived by comparing the excitation current with a reference and the resultant error signal acts to control the excitation current, it becomes possible to omit an expensive and complicated dividing circuit arranged to eliminate fluctuations included in the excitation current.

OUTLINE OF THE DRAWINGS

For a better understanding of the present invention, as well as other objects and further features thereof, reference is made to the following detailed description to be read in conjunction with the accompanying drawings, wherein.

Figure 4:
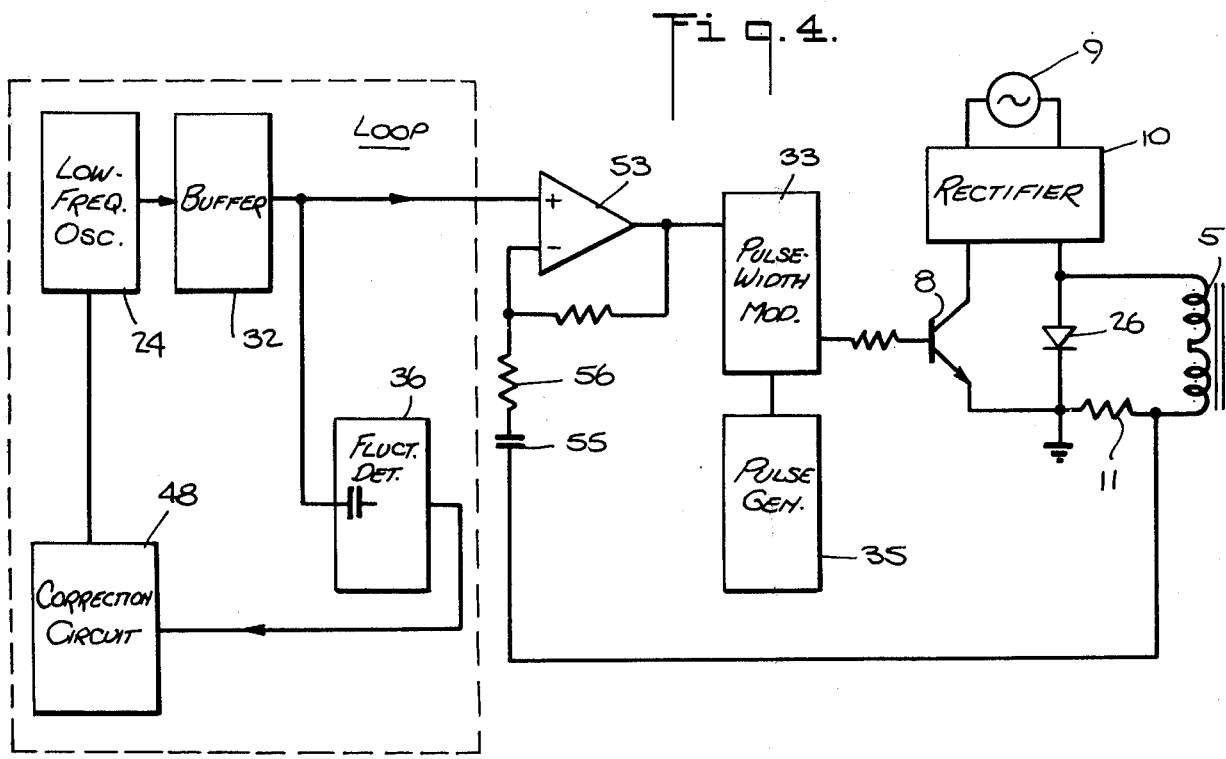
Figure 5:
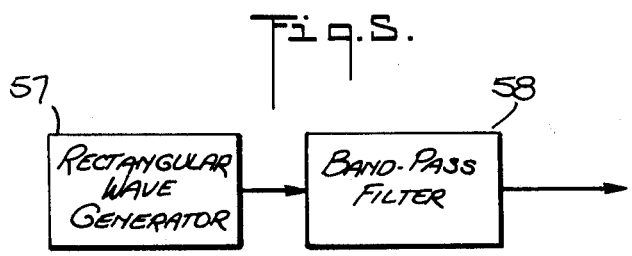
Figure 6:
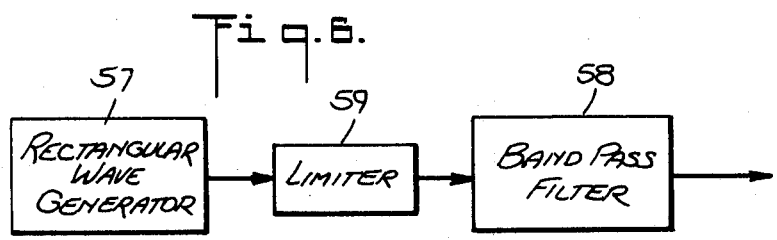
Figure 7:
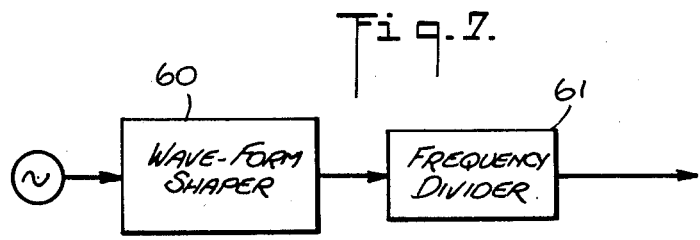
Figure 8:
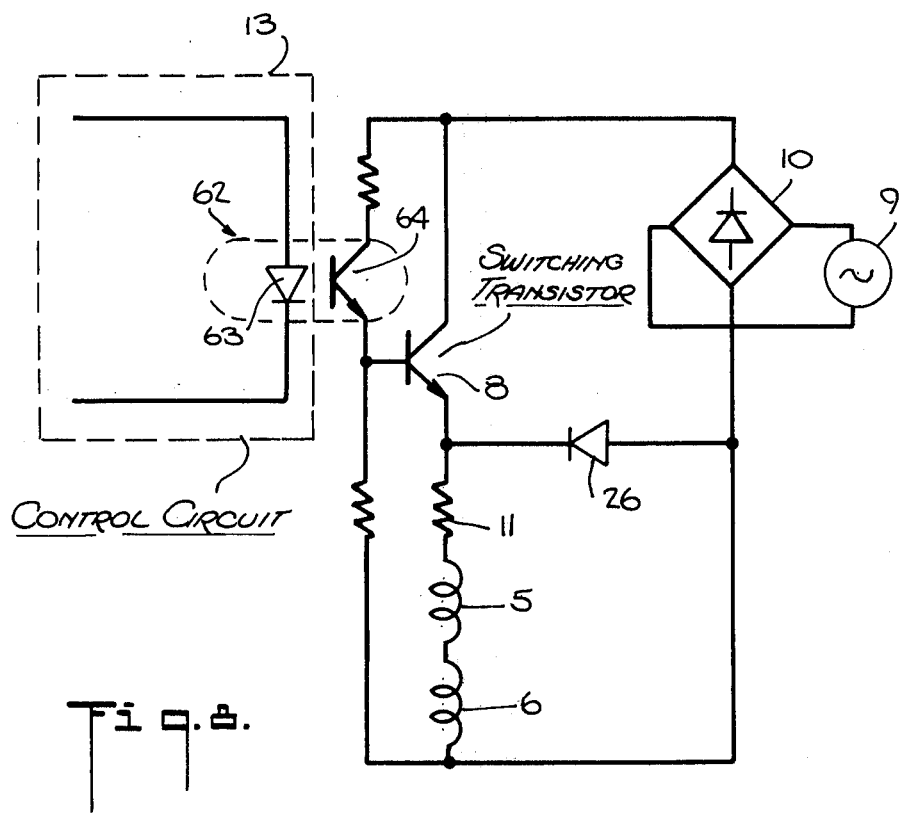
Figure 9:
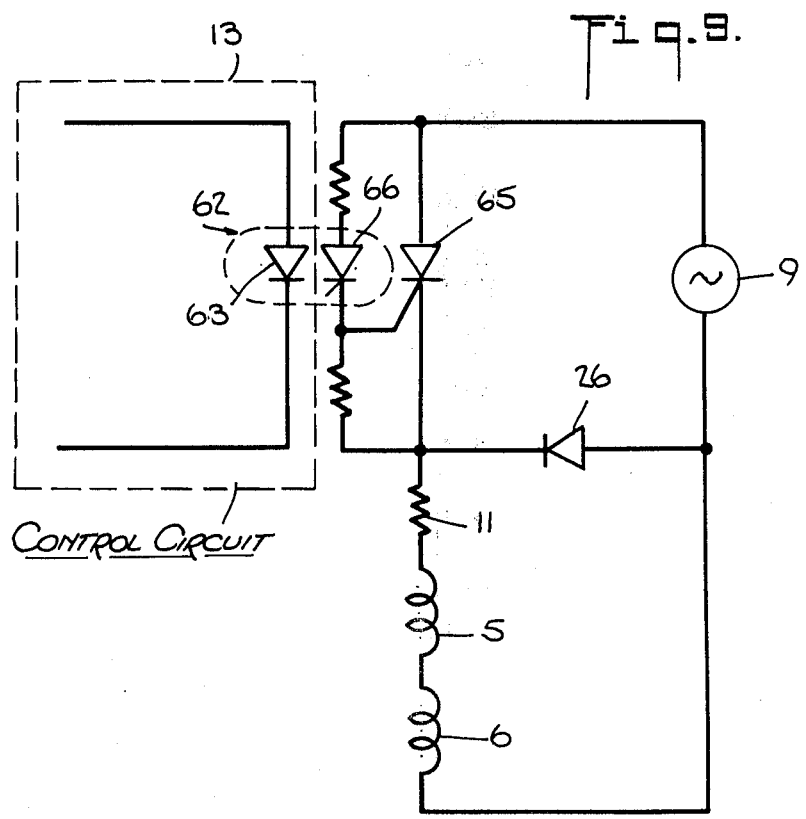

FIGS. 3A to D are wave forms illustrating the operation of the excitation system embodiments of the invention;

FIG. 4 is a schematic diagram of a third preferred embodiment of an excitation system for a magnetic flowmeter in accordance with the invention;

FIGS. 5 to 7 are block diagrams showing other examples of a low-frequency oscillator for inclusion in the invention; and FIGS. 8 and 9 illustrate other examples of the switching means.

DESCRIPTION OF INVENTION

First Embodiment

Figure 1:
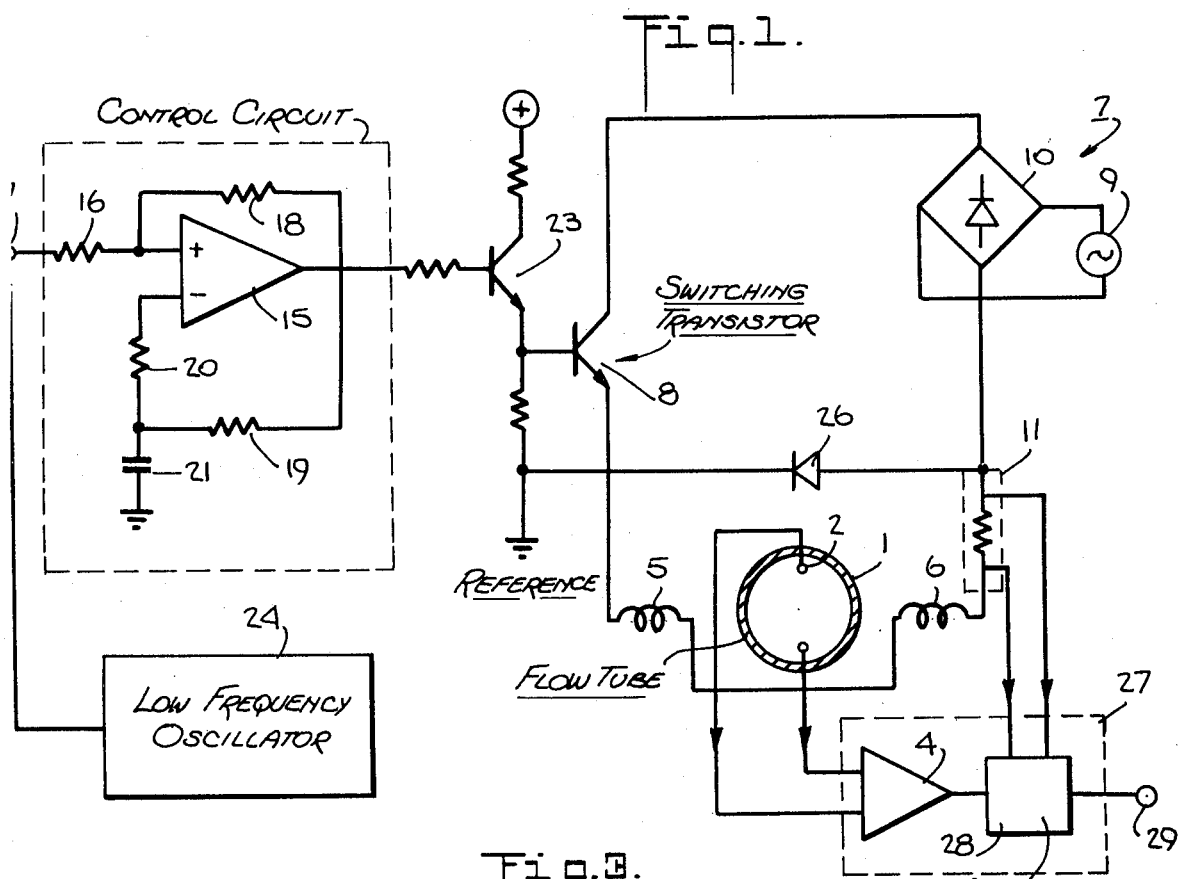
FIG. 1 is a schematic diagram of a first preferred embodiment of a magnetic flowmeter having an excitation system in accordance with the invention.

Referring now to FIG. 1, there is shown a magnetic flowmeter having an excitation system in accordance with this invention. In this figure, liquid to be metered is conducted through a flow tube 1 having a pair of electrodes 2 and 3 disposed at diametrically-opposed positions thereon. The voltage induced between these electrodes is applied to the amplifier 4 of a signal converter 27. Serially-connected excitation coils 5 and 6 act to generate a magnetic field whose lines of flux are perpendicular both to the transverse axis passing through electrodes 2 and 3 and the longitudinal axis of the flow tube, the coils being arranged at opposed positions with respect to the flow tube.

A switching element constituted by a transistor 8 is interposed between excitation coils 5 and 6 and an electric power source, generally designated by reference numeral 7. The power source is formed by a commercial power line source 9 which is connected to the input junctions of a full-wave rectifier bridge 10 whose output junctions are connected between the collector of switching transistor 8 and one end of a resistor 11 which serves to derive a reference signal from the excitation circuit. The emitter of transistor 8 is connected to a fixed reference level to which is also connected one end of excitation coil 5. The other end of coil 5 is connected to the one end of coil 6 whose other end is connected to resistor 11.

Switching transistor 8 is "on-off" controlled at a high-frequency rate (i.e., 3 KHz), which is more than 10 times higher than the commercial power line frequency. A control circuit enclosed in dotted-line block 13 acts to supply an "on-off" control signal to switching transistor 8. This circuit is primarily composed of an operational amplifier 15 whose noninverting (+) input terminal is connected both to an input terminal 17 through a resistor 16 and to the output terminal of the amplifier through a positive feedback resistor 18. This output terminal is also connected to the inverting (−) input terminal of the amplifier through negative feedback resistors 19 and 20. The junction of these resistors is connected to a reference level through a capacitor 21.

As is well known, the positive feedback ratio of amplifier 15 is determined by the ratio of resistor 16 to resistor 18. On the other hand, in the negative feedbck loop of the amplifier, capacitor 21 functions as a first order lag element. Accordingly, adjustment for the inverting frequency and/or duty cycle thereof can be accomplished by selecting these constants in the respective feedback loops.

In the arrangement shown in FIG. 1, the output of operational amplifier 15 is modulated by an input voltage applied to an input terminal 17. The output of amplifier 15 is applied to a transistor 23 whose emitter is connected to the base of switching transistor 8. As a result, transistor 8 is "on-off" controlled in conformity with the output pulses yielded by amplifier 15, and the "on-off" duty ratio thereof is modulated gradually by a low-frequency sinusoidal wave whose frequency is less than that of the commercial power line frequency (i.e., ¼ to ⅛ of the usual 50 or 60 Hz wave). To generate this low-frequency wave, a low-frequency sinusoidal wave oscillator 24 is provided whose output is applied to input terminal 17 of control circuit 13.

We will now explain in greater detail in connection with FIGS. 3A to D the function of control circuit 13. The "on-off" duty ratio of the output from operational amplifier 15 is proportional to the instantaneous sampling value of the low-frequency sinusoidal wave produced by oscillator 24. The control circuit 13 is preadjusted so that the duty ratio assumes, for example, a ½ value when the low-frequency wave crosses zero level.

FIG. 3A shows the low-frequency sinusoidal wave output of oscillator 24, while FIG. 3B shows the output of the operational amplifier 15. As will be evident from these figures, the duty ratio assumes its maximum value at the positive peak of the low-frequency sinusoidal wave, and it assumes its minimum value at the negative peak of this wave. While between these peaks, the duty ratio varies gradually in the manner of a sine wave.

FIG. 3C shows the full-wave rectified output voltage of power source 7, which is not yet filtered. The rectified output voltage illustrated in this figure is applied to switching transistor 8 which acts to chop this voltage in accordance with the pulse signal shown in FIG. 3B. The resultant chopped output is applied to excitation coils 5 and 6.

When transistor 8 is in its "on" state, a voltage proportional to the instantaneous voltage of the full-wave rectified output is applied to coils 5 and 6. On the other hand, when switching transistor 8 is in its "off" state, the current is then produced by the energy stored in these coils. This current flows through a diode 26 connected between the ends of the serially-connected coils 5 and 6 in the same direction as that during the "on" period so as to maintain a constant current condition.

Thus the "on-off" duty ratio of switching transistor 8 whose "on-off" frequency is extremely high compared with the commercial power line frequency of source 9, is modulated by a low-frequency sinusoidal wave. As a result, a low-frequency sinusoidal current of the type shown in FIG. 3D flows in coils 5 and 6.

Though the voltage has unfiltered ripple components, because excitation coils 5 and 6 have a relatively high inductance, these coils function as a filter choke. Hence the ripple components of the excitation current are substantially eliminated, as shown in FIG. 3D, without the need for separate filter chokes.

Diode 26 serves to block out unwanted kick-back voltages which are produced when transistor 8 is in its "off" state and are directed toward the switching circuit composed of transistors 8 and 23 in conjunction with power source 7.

The signal induced between electrodes 2 and 3 is applied to a dividing circuit 28 through the amplifier 4 provided in converter 27. A reference signal proportional to the current flowing in the excitation coils 5 and 6 is applied to the other input terminal of the dividing circuit 28. This reference signal is obtained from resistor 11, whereby the induced signal output of amplifier 4 is divided by the reference signal. As a result, a mean flow signal which is proportional to the average velocity of the flowing liquid is yielded at the output terminal 29 of converter 27.

Second Embodiment

Figure 2:
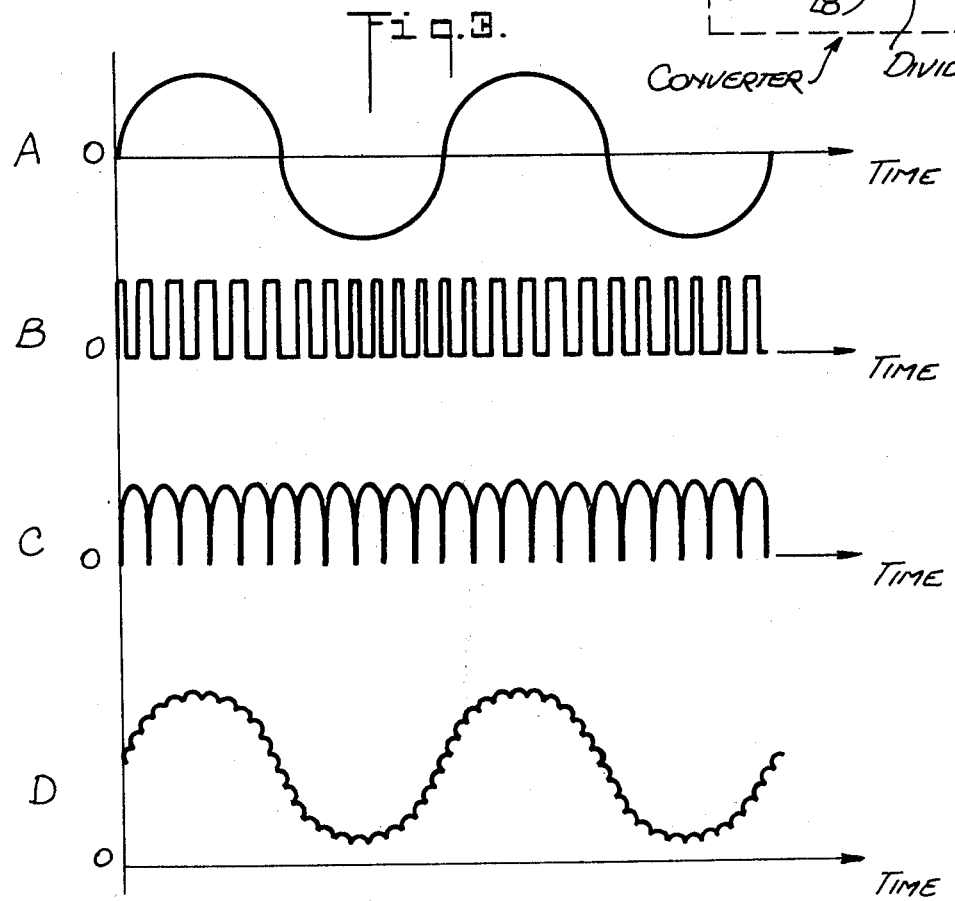
FIG. 2 is a schematic diagram of a second preferred embodiment of an excitation system in accordance with the invention.

FIG. 2 shows a second embodiment of an excitation system in accordance with the invention. In this figure, like reference numerals in FIG. 1 are used to designate like components. To avoid repetition, explanations for these components are omitted. The advantage of this embodiment is that fluctuating components included in the excitation current can be eliminated without the need for a dividing circuit as in FIG. 1.

In the embodiment shown in FIG. 2, a low-frequency oscillator 24, which is constituted by a Wien bridge 30 and an operational amplifier 31 acts to generate a sinusoidal wave having a frequency in a range from several Hz to 20 Hz.

The output of oscillator 24 is applied to one input of a pulse-width modulating circuit 33 (this corresponds to control circuit 13 in the first embodiment) through a buffer 32 including an operational amplifier 34. To the other input terminal of the pulse-width modulating circuit 33, there is applied a pulse signal having a constant frequency which is generated by a pulse generator 35. In the pulse-width modulating circuit 33, the pulse width is modulated by the output of low-frequency wave oscillator 24 applied through buffer 32. In practice, the pulse-width modulating circuit 33 and the pulse generator 35 may be constituted by semiconductive integrated circuit units which are commercially available.

We shall now explain the behavior of this embodiment, again utilizing FIGS. 3A to D. FIG. 3A shows the output sinusoidal wave of the low-frequency oscillator 24, while FIG. 3B shows the output of the pulse-width modulating circuit 33. The duty ratio of the output from the pulse-width modulating circuit 33, as shown by FIGS. 3A and 3B, assumes its maximum value at the instantaneous maximum value of the sinusoidal wave, and it has a ratio of about ½ when the sinusoidal wave crosses zero level. The duty ratio assumes its minimum value at the instantaneous minimum value of the sinusoidal wave.

The output of pulse-width modulating circuit 33 is then applied to the base of switching transistor 8 wherein the source current is "on-off" controlled. A fluctuation-detecting circuit enclosed in dotted-line block 36 serves to detect fluctuation in the excitation current. A signal proportional to the excitation current is detected by resistor 11. The resultant signal is applied through a capacitor 37 to a full-wave rectifier constituted by an operational amplifier 38, diodes 39 and 40, and resistors 41, 42 and 43.

Now let us suppose that the respective resistance value of resistors 41, 42, 43, 44 and 45 are represented by values $R_1$, $R_1$, $2R_2$, $R_2$ and $R_2$. Amplifier 38 produces a negative output for a positive input. As the result, diode 40, which is connected to the output terminal of amplifier 38, is rendered conductive and is put in its "on" state, whereas diode 39 is put in its "off" state. Under these conditions, a current signal $V/2R_2$, wherein U is the input voltage signal from resistor 11, is applied through a resistor 43 to a differential amplifier 46 which functions as a summing amplifier and also as a smoothing circuit.

On the other hand, when the polarity of the input signal voltage U turns negative, amplifier 38 yields a positive output, so that diode 39 is then put in the "on" state and diode 40 in the "off" state. In this case, the current signal fed to amplifier 46 from amplifier 38 is expressed by $-U/R_2$, since the gain of amplifier 38 is $-1$. Furthermore, the current signal $U/2R_2$ is applied to amplifier 46 through resistor 43. Therefore, the total input current signal given by $-U/2R_2$ is applied to amplifier 46.

Thus the circuit composed of operational amplifier 38, diodes 39 and 40 and resistors 41 to 44 functions as a fullwave rectifier. Terminal 47 is a reference voltage signal terminal. At the junction of the inverting (−) input terminal of amplifier 46, the current signal is compared with a current signal based upon this reference voltage. A smoothed error voltage signal is obtained at the output terminal of amplifier 46.

In accordance with the error signal thereof, the excitation current flowing in excitation coils 5 and 6 is continually controlled. Thus, the output of fluctuation-detecting circuit 36 is applied to a correction circuit 48 constituted by a diode 49, a capacitor 50, and resistors 51 and 52. The resistance value of diode 49, one end of which is grounded, the other end being connected to resistor 51 through the capacitor 50, varies in accordance with the applied voltage signal which is proportional to the error voltage signal. The signal detected by diode 49 is applied to operational amplifier 31 in the low-frequency oscillator 24 through resistor 52.

As a consequence, the amplitude of the low-frequency wave of oscillator 24 is governed to provide a constant current, the amplitude of which is determined by the reference voltage signal.

Thus in accordance with this embodiment, the effects of fluctuations in the excitation current can be eliminated without the need for a complicated dividing circuit, and a mean flow signal proportional to the volumetric flow rate can be obtained from electrodes 2 and 3.

Third Embodiment

In the previous embodiment, the fluctuations in the excitation current flowing in coils 5 and 6 are detected by the use of fluctuation-detecting circuit 36, and the low-frequency wave oscillator 24 is governed by a signal derived from the detected signal. These circuits may be replaced with other circuits, such as those shown in FIG. 4.

In FIG. 4, the output of low-frequency oscillator 24 is applied through buffer 32 both to a differential amplifier 53 and to the fluctuation-detecting circuit 36, thereby detecting fluctuations in the output of low-frequency oscillator 24. The error signal therefrom is applied to correction circuit 48.

By means of a loop 54 which includes circuits 36 and 48, the amplitude of low-frequency oscillator 24 is continually controlled. The resultant low-frequency wave having a constant amplitude is then applied to a differential amplifier 53 as a reference signal.

On the other hand, the signal voltage detected by resistor 11, which is connected between a fixed reference level and the excitation coil 6 is negatively fed back to the inverting input (−) terminal of differential amplifier 53 through a capacitor 55 and a resistor 56, so as to obtain an error signal which corresponds to the fluctuations in the excitation current flowing in excitation coils 5 and 6. This error signal is applied to switching transistor 8, thereby eliminating low-frequency fluctuating components included in the excitation current in the manner explained in connection with the second embodiment. Thus the control circuit of this embodiment functions so that the amplitude of the excitation current is made to conform with that of the low-frequency reference signal produced by loop 54.

Low Frequency Oscillators

FIGS. 5 to 7 show other examples of a low-frequency oscillator suitable for the excitation systems in accordance with the invention. In FIG. 5, a low-frequency sinusoidal wave oscillator is constituted by a rectangular-wave generator 57 and a band-pass filter 58. The output of rectangular wave generator 57 is applied to band-pass filter 58 wherein the fundamental frequency is passed, thereby producing a sinusoidal wave.

In FIG. 6, a limiter 59 is arranged between the rectangular-wave generator 57 and the band-pass filter 58 shown in FIG. 5. With this arrangement, the output of rectangular-wave generator 57, after its amplitude is rendered constant by this limiter, is applied to the band-pass filter 58 to yield a sinusoidal wave having a constant amplitude. This wave is obtained by a relatively simple construction, as compared with the loop 54 arrangement in the third embodiment.

Figure 3:
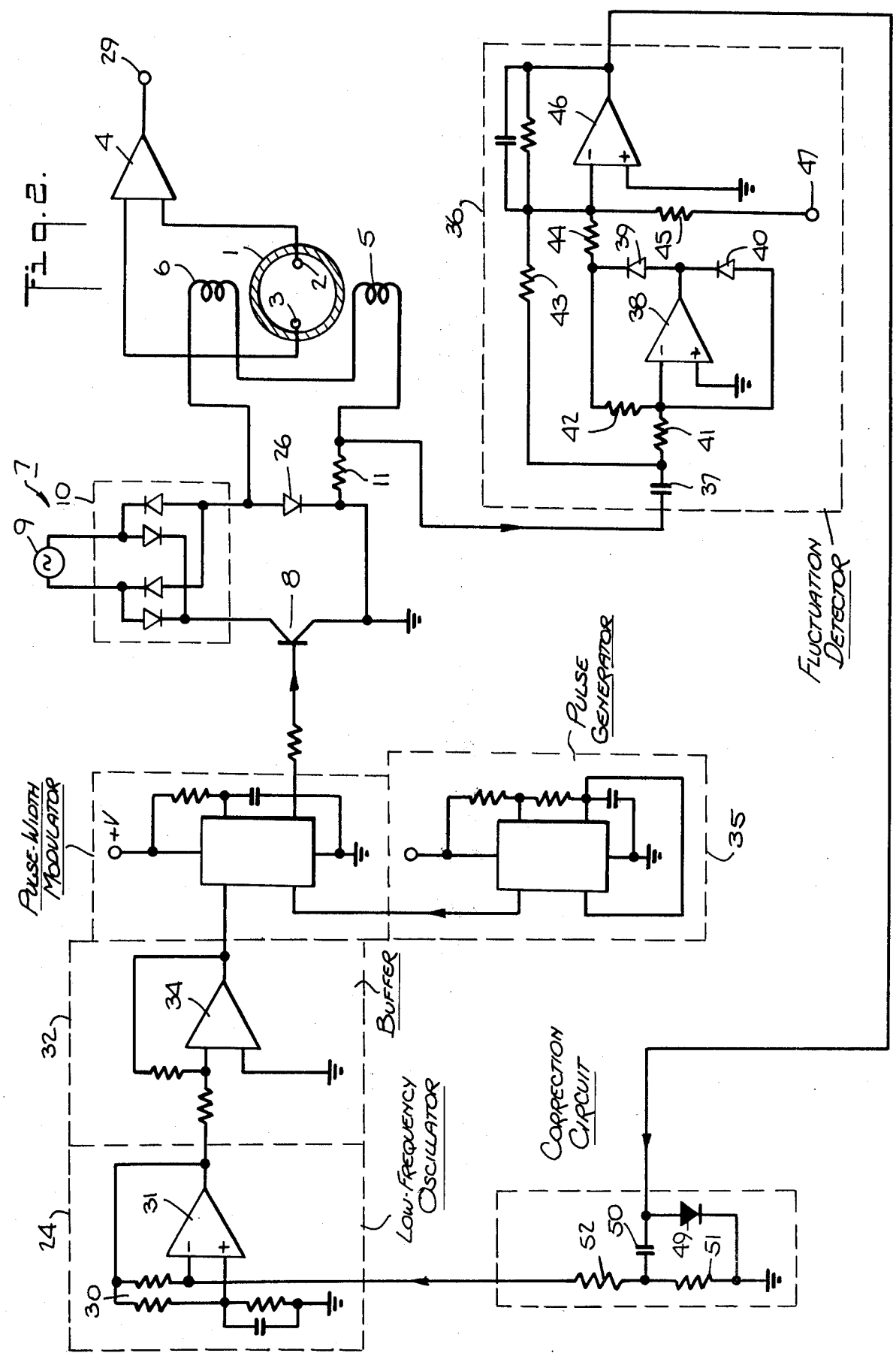

FIG. 7 shows still another example of the low-frequency rectangular wave generator. In this figure, the output of a-c power source 7 of the type employed in FIGS. 1 to 3 is applied to a wave form shaper 60, and the usual 50 or 60 Hz wave is shaped into a rectangular wave which is applied to a frequency divider 61, whereby its frequency is decreased to an extent rendering it suitable for excitation systems in accordance with the invention. Furthermore, the low-frequency oscillator 24 may be replaced with other circuits, such as a phase-shift type oscillator.

Switching Means

FIGS. 8 and 9 show other examples of switching means in accordance with this invention. In FIG. 8, a photo-coupler 62 is employed for input-output isolation. In this arrangement, the output of control circuit 13 is applied to a light-emitting diode (LED) 63 whereby the LED emits a light signal. This light signal is received and sensed by a photo-transistor 64 so as to convert the light signal into a corresponding electrical signal. The electrical signal is applied to switching transistor 8.

Thus, by use of this photo-coupler technique, the section of the system including the "on-off" ratio control means an be isolated from the section that includes the electric power source 7. Hence the reference voltage level may be freely determined.

Though in the embodiment in FIG. 8 a photo-coupler consisting of an LED and a photo-transistor is used, the photo-transistor may be replaced with other devices such as a photo thyristor. Also, through switching transistor 8 is used as a switching element, this transistor may be replaced with other switching elements such as a thyristor, as shown in FIG. 9, which thyristor is indicated by numeral 65.

In this case, current from AC source 9, which is not yet rectified, is applied directly to thyristor 65. In this arrangement, the light signal from photo-diode 63 in the photo-coupler 62 is intercepted by a photo-thyristor 66, and the electrical signal therefrom is applied to thyristor 65 as a gate trigger current, the firing angle thereof being varied by the difference of the trigger position. By use of the thyristor, a continuous current whose amplitude is modulated by the low-frequency sinusoidal wave is obtained without a rectifier.

Pulse-width modulator 33 and pulse generator 35 shown in FIGS. 2 and 4 may be replaced with other circuits such as the control circuit 13 shown in FIG. 1. Furthermore, a transistor or field-effect transistor (FET), which is generally used as a variable impedance element in an automatic gain control (AGC) circuit and the like, may be used in place of diode 49 in correction circuit 48 which serves to control the amplitude of the low-frequency oscillator 24.

Though in the above-described embodiments, resistor 11 acts to detect the excitation current flowing in excitation coils 5 and 6, such current detection may be carried out by means of a current transformer. Furthermore, indirect current detecting means such as a pickup coil, a Hall effect element or a magnet-electro converting element may be used in place of resistor 11 which directly detects the excitation current.

Also, while in the above-described embodiments, a low-frequency sinusoidal wave is used to vary the "on-off" ratio, a triangular wave which gradually varies may be used in lieu thereof. By the use of a gradually varying wave, harmonic components included in the excitation current may be rendered negligible as compared to those produced in arrangements using a rectangular wave.

Furthermore, if polyphase alternating current is used as an electric power source, ripple components in the excitation current may be reduced considerably.

It will be apparent from the foregoing that a magnetic flowmeter in accordance with the present invention possesses the following features:

A. Because the coils are excited by a low-frequency wave, the effects of eddy currents can be obviated.
B. Because the excitation current is produced by the use of a high-speed switching technique, one may omit a power amplifier and the size of the circuits may be reduced.
C. Because a low-frequency wave whose amplitude changes gradually in sine wave fashion is used as the excitation current, special circuits to eliminate the effects of electromagnetic-induction caused by high-frequency harmonics can be omitted.
D. Because commercial electric power is used as a source, this invention may be embodied effectively in a magnetic flowmeter having a relatively large diameter.
E. Fluctuating components included in the excitation current can be eliminated without the need for a complicated dividing circuit.

While there have been shown and described preferred embodiments of a magnetic flowmeter in accordance with the invention, it will be appreciated that many changes and modifications may be made therein without, however, departing from the essential spirit of the invention.

We claim:
1. In an electromagnetic flowmeter provided with a flow tube through which the fluid to be metered is conducted, the tube having a pair of electrodes mounted at diametrically-opposed positions thereon and including excitation coils to establish a magnetic field in the tube which is transverse to the direction of flow, the combination comprising:
    A. switching means interposed between said coils and a power source;
    B. control means to effect "on-off" control of said switching means at a rate which is higher than a predetermined commercial a-c power frequency; and
    C. means gradually to change the duty ratio of said control means at a low-frequency rate which is less than said commercial frequency.
2. The combination as set forth in claim 1, further including means to detect fluctuations included in the excitation current flowing in said coils, and means continuously to control said excitation current in accordance with said detected signal to maintain a constant amplitude.
3. The combination as set forth in claim 1, wherein said power source is a full-wave rectifier coupled to a commercial a-c power line.
4. The combination as set forth in claim 3, wherein said switching means is a transistor whose emitter-collector circuit is connected in series with said coils to the output of said rectifier.
5. The combination as set forth in claim 4, wherein said control means is an operational amplifier having two inputs, the output of said amplifier being positively fed back to one of said inputs to produce high-frequency pulses which are applied to the gate of said transmitter, the other input being connected to a low-frequency oscillator.

* * * * *